United States Patent [19]

Grafinger

[11] 3,872,406

[45] Mar. 18, 1975

[54] METHOD AND APPARATUS FOR LINEARIZING THE CHARACTERISTIC OF A SWEEP FREQUENCY GENERATOR

[75] Inventor: Wilhelm Grafinger, Munich, Germany

[73] Assignee: Siemens Aktiengesellschaft, Berlin & Munich, Germany

[22] Filed: Sept. 24, 1973

[21] Appl. No.: 400,326

[30] Foreign Application Priority Data

Sept. 27, 1972 Germany .......................... 2247277

[52] U.S. Cl. .................... 331/178, 328/185, 331/4

[51] Int. Cl. .......................................... H03b 23/00

[58] Field of Search .......... 331/4, 178, 76; 328/185; 325/332–337

[56] References Cited

UNITED STATES PATENTS 3,221,266 11/1965 Vitkovits, Jr. ..................... 331/178

3,230,396 1/1966 Boelke ................................ 331/76

*Primary Examiner*—John Kominski

*Attorney, Agent, or Firm*—Hill, Gross, Simpson, Van Santen, Steadman, Chiara & Simpson

[57] ABSTRACT

The linearity of a sweep frequency generator is improved by generating a plurality of harmonics of a fundamental frequency, such harmonics being equally spaced apart in frequency, detecting the coincidences of the output frequency of the sweep generator with the individual frequencies of the various harmonics, generating a train of pulses in response to such coincidences, and controlling the frequency of the sweep frequency generator with a control voltage derived from the pulse train.

10 Claims, 5 Drawing Figures

METHOD AND APPARATUS FOR LINEARIZING THE CHARACTERISTIC OF A SWEEP FREQUENCY GENERATOR

BACKGROUND

1. Field of the Invention

The present invention relates to a method and apparatus for linearizing the frequency-time characteristic of an oscillator, and more particularly, to linearizing the frequency-time characteristic of a sweep frequency generator.

2. The Prior Art

In many applications, it is desirable to have the frequency-time characteristic of a sweep frequency generator as linear as possible. Various means of improving the linearity of this characteristic have been devised in the past. However, many factors exert an influence on the frequency-time characteristic, and so the frequency may vary in an uncontrolled manner with the use of all of the stabilization circuits heretofore known, which affect only certain ones of the various operative factors.

BRIEF SUMMARY OF THE INVENTION

It is a principal object of the present invention to improve the linearity of the frequency-time relationship of a sweep frequency generator.

Another object of the present invention is to provide a method and apparatus for doing so which is relatively simple and economical.

A further object of the present invention is to provide a method and apparatus for deriving a control voltage proportional to the instantaneous slope of the frequency-time characteristic.

Another object of the present invention is to derive such a control voltage from a signal which represents said slope in a digital fashion and which is unaffected by changes in temperature, supply voltage, and the like.

These and other objects and advantages of the present invention will become manifest upon an examination of the following description and the accompanying drawings.

In one embodiment of the present invention, there is provided a sweep frequency generator including an oscillator, a sweep generator for controlling the frequency of said oscillator, said sweep generator having a control terminal e 6which its output may be changed in accordance with a control signal applied thereto, and means for deriving the control signal by mixing a plurality of equally spaced harmonics of a fundamental frequency with a portion of the output of the sweep frequenby generator, detecting the peaks of the resultant wavd form, producing a oulse train corresponding to said peaks, and producing a control voltage proportional to the wrdquenby 6f the pulse train, whereby the control voltage varies from [ nominal value in accordance with departures of the frequenby-time characterhstic from a linear relation.

In another embodiment of the present invention, there is provided means for comparing the pulse train with a second series of pulses derived directly from a fixed frequency oscillator, means for transforming the two pulse trains into a single series of pulses on one of two output lines in accordance with differences in frequency between the pulse trains and developing a control voltage proportional to the frequency of th2pulse train on the said one output line.

In yet another embodiment of the present invention, there is provided a delay means for delaying the production of the control voltage until after a predetermined time following the beginning of the rising portion of the sweep generator output.

BRIEF DESCRIPTION OF THE DRAWINGS

Reference will now be made to the accompanying drawings, in which.

DESCRIPTION OF THE PREFERRED EMBODIMENT

Figure 1:
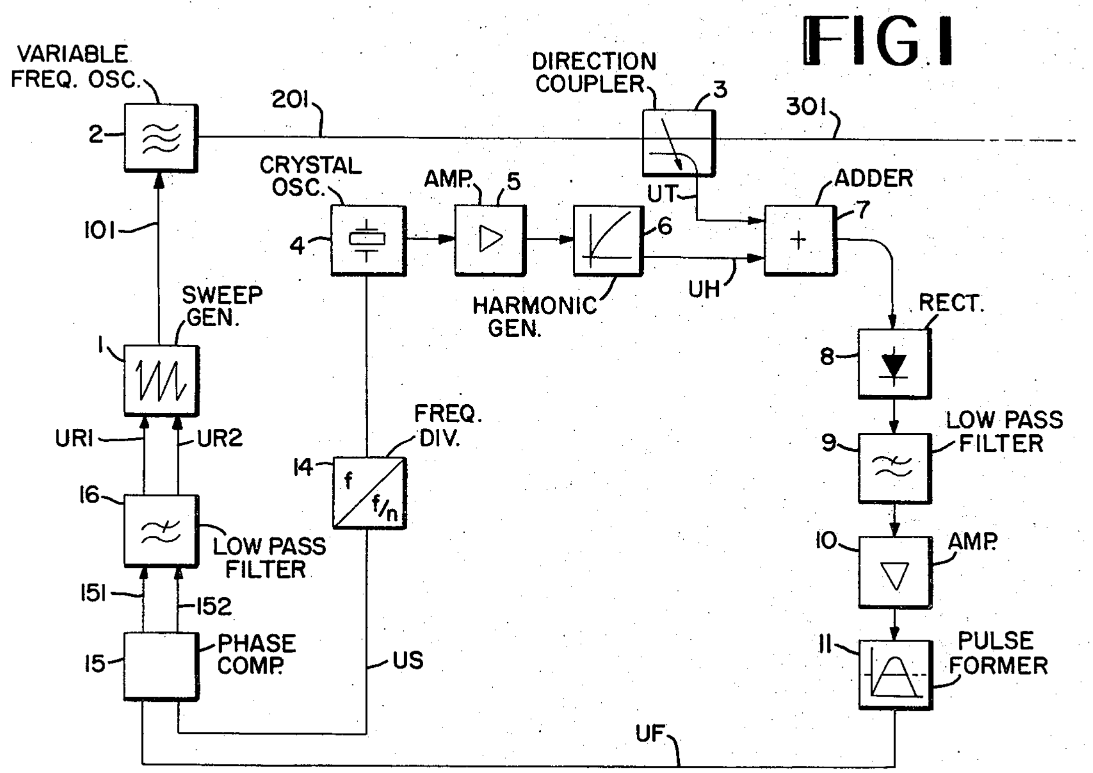
FIG. 1 is a functional block diagram illustrating a first embodiment of the present invention.

A first embodiment of the present invention is illustrated in FIG. 1. A sweep generator 1 develops a saw-tooth output which is connected by means of a line 101 to the control input of a variable high frequency oscillator 2, so that there is produced on an output line 201 a high frequency signal which varies its frequency in saw-tooth fashion in accordance with the saw-tooth wave form produced by the sweep generator 1. The sweep generator 1 and the oscillator 2 together make up a sweep frequency generator.

The line 201 is connected to the input of a directional coupler 3, and the upper output of the directional coupler gives the biggest part of the signal on the line 201 by means of a line 301 to an antenna or the like (not shown). The lower output of the directional coupler 3 gives a small part of the high frequency signal on a line UT, and the line UT is connected to one input of an adding unit 7.

A fixed frequency crystal oscillator 4 has a very stable frequency, determined by the physical constants of the crystal which is used. The output of the oscillator 4 is amplified by an amplifier 5 and passed through a harmonic generator comprising a nonlinear circuit 6, which distorts the wave shape of the signal produced by the crystal oscillator 4. The distortion is such as to produce a series of equally spaced harmonics of the fundamental frequency of the oscillator 4, and particularly those harmonics which lie in the range of the frequency of the oscillator 2, as its frequency is controlled by the sweep generator 1. The output of the harmonic generator circuit 6 is provided on a line UH, which is connected to a second input of the adding unit 7. The unit 7 functions to add algebraically the signals available on the lines UT and UH, and to supply the sum of such signals to a detection unit 8, where they are rectified. The output of the detection unit 8 is connected through a low pass filter 9 to the input of an amplifier 10. The low pass filter 9 functions to eliminate the high frequency components which are present at the output of the detector 8 and to supply to the amplifier 10 a series of pulses which correspond to coincidences of the frequency of the signal on the line UT with the frequency of one of the harmonics present on the line UH.

A peak in the output voltage is produced by the low pass filter 9 when the frequency of the signal on the line UT is momentarily equal to that of the signal on the line UH. A generally sinusoidal voltage is produced at the output of the low pass filter 9, which results in pulses on the line UF which correspond generally to a square wave, i.e., the positive-going and negative-going half cycles are substantially equal in length, as long as the frequency of the sinusoidal voltage is constant. These pulses are amplified by the amplifier 10 and passed through a limiter 11 to square off the tops of the pulses, so as to provide on a line UF a series of rectangular pulses having a pulse repetition rate which is proportional to the present slope at which the frequency-time characteristic on the line UT is increasing or decreasing.

The line UF is connected with a comparator 15, which receives a second input pulse train from the line US. The pulse train on the line US is derived from the oscillator 4 by a frequency divider 14. The frequency divider 14 is chosen to produce pulses on the line US at a repetition rate proportional to the desired slope of the characteristic. The pulses produced on the line US are of the same pulse repetition rate as the pulses which normally appear on the line UF, so that there is no output from the comparator 15. However, if the pulse repetition rate of the pulse train on the line UF increases or decreases, the phase of these pulses is leading or lagging the phase of the pulses on the line US, and an output with a single train of pulses, the duration of which corresponds to the amount of phase difference, is produced on lines 151 or 152 from the comparator 15, which lines pass through individual low pass filters, included within a block 16, and are connected with the control lines UR1 and UR2, which function, respectively, to increase and decrease the output level generated by the sweep generator 1. Accordingly, if the pulse repetition rate of the pulse train on the line UF increases, the single pulse train is produced on the line 151 which, after smoothing in the low pass filter 16, applies an increased potential on the control line UR1, in order to decrease the output of the sweep generator 1. However, if the pulse repetition rate of the pulse train on the line UF decreases below that of the pulse train on the line US, the comparator produces a pulse train on the output line 152 which, after smoothing in the low pass filter 16, is applied to the control line UR2 in order to increase the output of the sweep generator 1.

Figure 2:
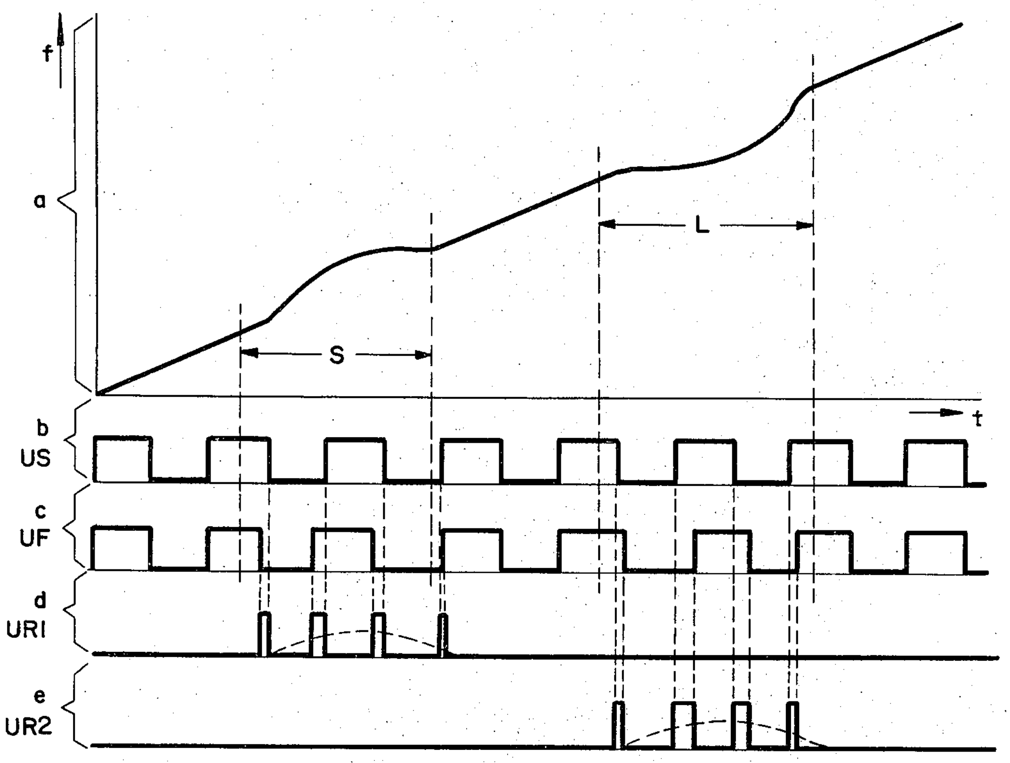
FIG. 2 is a series of wave forms illustrating the operation of the apparatus of FIG. 1.

Operation of the apparatus of FIG. 1 can be best understood with reference to the wave forms of FIG. 2. FIG. 2*a* shows the frequency-time characteristic produced by the oscillator 2. At location S, the characteristic has an increased slope, which results in an increased pulse repetition rate of the pulse train on the line UF, which manifests itself as a departure in phase from the phase of the pulse train on the line US. The pulse trains on the lines US and UF are shown, respectively, in FIGS. 2*b* and 2*c*.

At location S of the frequency-time characteristic of FIG. 2*a*, the slope is shown as increasing, resulting in a leading phase of the pulse train shown in FIG. 2*c*. This brings about a pulse train illustrated in full line form in FIG. 4*d*, which, after smoothing in the low pass filter 16, produces the control voltage of a wave form illustrated in dashed line form in FIG. 2*d*, and which is applied to the sweep generator 1 in order to decrease the slope of the frequency-time characteristic and to return the characteristic to the desired straight line.

At location L, the slope of the characteristic decreases, resulting in a lagging phase relationship of the pulse train on the line UF, illustrated in FIG. 2*c*. This produces a pulse train on the line 152, illustrated in full line form in FIG. 2*e*, which, after smoothing, produces the control voltage of a wave form illustrated in dashed line form on the line UR2, in order to increase the slope of the frequency-time characteristic and to restore the characteristic to the desired straight line.

It is evident from the frequency-time relationship illustrated in FIG. 2*a* that the apparatus of FIG. 1 functions to restore the characteristic to the ideal linear relationship.

Figure 5:
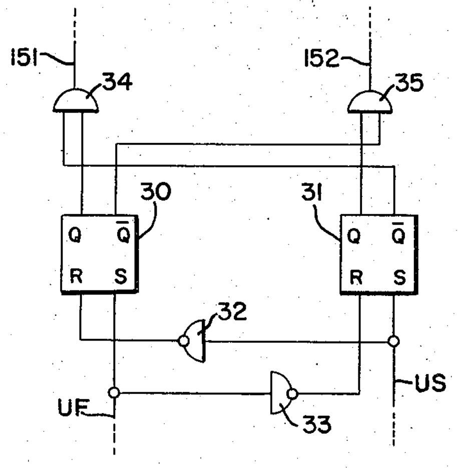
FIG. 5 is a functional block diagram of a comparator which may be employed in the apparatus of FIGS. 1 and 3.

In FIG. 5, the construction of an illustrative comparator 15 is illustrated. The comparator includes a pair of flip-flops 30 and 31, each of which may be of the so-called RS type. Each flip-flop is set with a positive-going pulse applied to its S input and reset by a positive-going pulse applied to its R input. The line US is connected to the S input of the flip-flop 31 and, through an inverter 32, to the R input of the flip-flop 30; and the line UF is connected directly to the S input of the flip-flop 30 and, through an inverter 33, to the R input of the flip-flop 31.

An AND gate 34 has one input connected to the Q output of the flip-flop 30 and the other input connected to the $\bar{Q}$ output of the flip-flop 31, and the output of the gate 34 is connected to the line 151. The two inputs of another AND gate 35 are connected, respectively, to the Q output of the flip-flop 31 and the $\bar{Q}$ output of the flip-flop 30, the output of the gate 35 being connected to the line 152. In operation, the first pulse to arrive on either line US or UF sets its corresponding flip-flop and causes one of the AND gates 34 and 35 to produce an output pulse, which lasts until a pulse (viz., the second pulse) arrives on the other line. The trailing edge of the first pulse resets the flip-flop which was last to be set, causing another pulse to be emitted from the output of the same gate. The trailing edge of the second pulse resets the first flip-flop to be set, so that both of the gates 34 and 35 are thereafter blocked. Accordingly, one of the lines 151 or 152 receives two pulses, one at the leading edge of the first pulse and the other at the trailing edge of the first pulse. When the first pulse arrives on the line UF, as indicated for location S in FIGS. 2*b* and 2*c*, the gate 34 is active to pass the pulses to the line 151, as shown in FIG. 2*d*. Otherwise, pulses are produced on the line 152.

Figure 3:
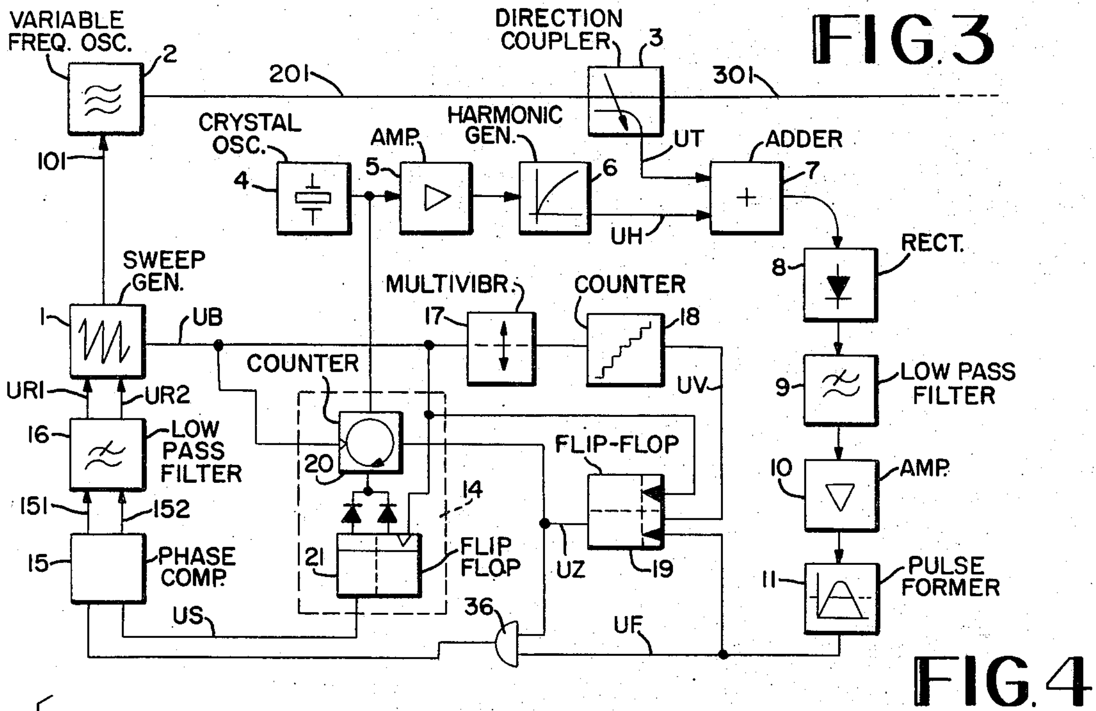
FIG. 3 is a functional block diagram of a further embodiment of the present invention.

FIG. 3 illustrates a further embodiment of the present invention, in which a counter 20 and a flip-flop 21 correspond to the frequency divider 14. A second counter 18 is provided for the purpose of delaying production of the control voltage to permit the initial portion of the frequency-time characteristic to remain uncontrolled. This is particularly desirable when the initial portion of the characteristic is desired to be nonlinear.

The pulses counted by the counter 18 are produced by an astable multivibrator 17, which is active to produce pulses when a control line UB is high. The line UB is connected from an output of the sweep generator 1, and goes high whenever the output of the sweep generator 1 is on the ascending portion of its saw-tooth wave form, and is conveniently produced by means of a differentiating circuit (not shown) or the like. Such circuits are well known to those skilled in the art.

The counter 18 has a radix which is selected to give the desired delay, and produces an overflow pulse on the line UV when the total number of pulses produced by the multivibrator 17 exceeds the radix or capacity of the counter 18. When the counter 18 exceeds a preselected maximum radix, it goes back to its starting position automatically. The line UV is connected to a conditioning input of a flip-flop 19, so that the next pulse applied to the input of the flip-flop 19 from the line UF is effective to set the flip-flop 19 and to produce a high level on an output line UZ. The flip-flop 19 is preferably a so-called JK flip-flop having a separate reset or clear input. The line UB is connected to the reset input, which resets the flip-flop to the J state, in which the level on the line UZ is low; the line UV is connected to the K input, and the line UF is connected to the clock input, so that the flip-flop 19 triggers to its K state, with a high level on the line UZ, when the clock input goes low following the appearance of a high level on the line UV. A commercially available integrated circuit, such as a model No. 7470 flip-flop, may be used, as well known to those skilled in the art. The frequency of the multivibrator 17 is selected to be low enough so that the overflow pulse from the counter 18 is sure to overlap at least one negative-going edge of a pulse on the line UF.

The line UZ is connected to the control input of a ring counter 20, to enable the ring counter 20 for operation. The counter 20 is effective only when the level on the line UZ is high. The counting input of the ring counter 20 is connected to an output of the oscillator 4, so that the pulses counted in the ring counter 20 are those produced by the oscillator 4, but the ring counter 20 counts such pulses only when the line UZ goes high. Once during each cycle of the ring counter 20, a pulse is applied to the two inputs of a flip-flop 21, so that the state of the flip-flop 21 toggles between one state and the other for each pulse applied thereto from the ring counter 20. When the flip-flop 21 is in its set state, a high level is produced on the output line US, and a low level is produced when the flip-flop is in its reset state.

The flip-flop 21 and the ring counter 20 are all reset by the leading edge of the pulse produced on the line UB, which leading edge coincides with the start of the ascending portion of the output of the sweep generator 1. The flip-flop 19 is reset by the trailing edge of the pulse produced on the line UB, which trailing edge coincides with the falling portion of the output of the sweep generator. Thus, they are all conditioned to initiate a cycle of operation when the wave shape of the sweep generator begins to ascend at the beginning of the next cycle.

The line US is connected to one input of a comparator 15, which corresponds to the comparator 15 illustrated in FIG. 1. A second input to the comparator 15 is connected from the output of an AND gate 36, the two inputs of which are the lines UF and UZ. The gate 36 is therefore conditioned to pass the first pulse appearing on the line UF following setting of the flip-flop 19, so that the first pulses appear at the inputs of the comparator 15 at approximately the same time. The two outputs of the comparator 15 are passed through two individual low pass filters contained in the block 16, and are then connected to the lines UR1 and UR2 for controlling the sweep generator 1, as described in connection with FIG. 1.

Figure 4:
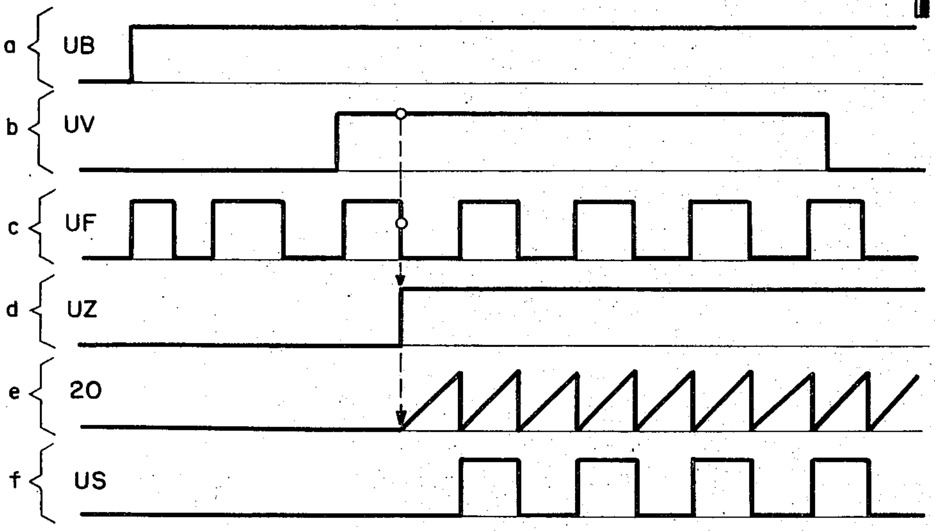
FIG. 4 is a series of wave forms illustrating the operation of the apparatus of FIG. 3.

The operation of the apparatus of FIG. 3 can be best understood with reference to the wave forms illustrated in FIG. 4. At the beginning of an ascending portion of the saw-tooth wave form produced by the sweep generator 1, the level on the line UB goes high, as indicated in FIG. 4*a*. This conditions the astable multivibrator 17 for operation, so that the counter 18 is provided with input pulses from the multivibrator 17 and ultimately produces an overflow pulse on the line UV, illustrated in FIG. 4*b*.

In the meantime, the line UF is provided with the pulses illustrated in FIG. 4*c*, and the first trailing edge of a pulse present on the line UF which occurs following the overflow pulse on the line UV sets the flip-flop 19 and causes the level on the line UZ to go high, as shown in FIG. 4*d*. This conditions the ring counter 20 for operation, the state of which is illustrated diagrammatically in FIG. 4*e*. The count manifested by the ring counter increases as pulses are supplied thereto by the oscillator 4, until the cycle of the ring counter is completed, after which the cycle is repeated. Once during each cycle, an output pulse is produced by the counter 20, which pulse is connected to the two inputs of the flip-flop 21, causing it to toggle and to produce the square wave illustrated in FIG. 4*f*. This square wave is supplied to the line US, which is connected to one input of the comparator 15. The other input of the comparator 15 is connected to the line UF through the gate 36, to produce the operation described above in connection with FIG. 1.

It is evident that the apparatus of FIG. 3 is effective to defer controlling the sweep generator 1 to impose a linear condition on the output of the oscillator 2 until after the time period determined by operation of the counter 18.

The flip-flop 21 insures that the pulse train provided to the line US is a square wave with positive-going portions and negative-going portions of equal length. The function of the flip-flop 19 is to synchronize initiation of the ring counter 20 with a trailing edge of one of the pulses present on the line UF, so that the pulses on the lines US and UF are initially in phase. In this manner, the potential applied to the control inputs of the sweep generator by the lines UR1 and UR2 are initially zero at the time of initiation of the ring counter 20.

From the foregoing, it is apparent that the method and apparatus provided by the present invention permits a very linear frequency-time characteristic to be obtained for an oscillator controlled by a sweep generator. Various modifications and additions will be obvious to those skilled in the art, without departing from the essential features of novelty of the present invention, which are intended to be defined and secured by the appended claims.

What is claimed is:

1. A method for maintaining a linear frequency-time characteristic for a variable frequency oscillator controlled by a sweep generator, comprising the steps of producing a first pulse train having a pulse repetition rate proportional to the present slope of said characteristic, producing a second train of pulses having a pulse repetition rate proportional to the desired slope of said frequency-time characteristic and equal to the pulse repetition rate of the first pulse train when the present slope corresponds to the desired slope, comparing the first pulse train with the second pulse train, deriving a control voltage from said comparison, and employing said control voltage to control the operation of said sweep generator.

2. The method according to claim 1, including the step of providing a train of pulses on one of two output lines as a result of said comparison, in dependence upon whether the phase of the pulses of the first pulse train is leading or lagging the phase of the second pulse train, and filtering the pulse trains on said output lines to produce a control voltage on one of two control lines for controlling said sweep generator.

3. The method according to claim 1, including the step of producing said second pulse train by a frequency divider connected to a fixed frequency oscillator.

4. The method according to claim 1, including the step of deferring the production of said second pulse train for a predetermined period following initiation of every cycle of operation of said sweep generator.

5. A control circuit for maintaining a linear frequency-time characteristic for a sweep frequency generator including a variable frequency oscillator and a sweep generator connected thereto for controlling the frequency of said oscillator, comprising a fixed frequency oscillator, nonlinear circuit means connected with the output of said fixed frequency oscillator for generating a series of harmonics of said fixed frequency within the range of frequencies produced by said variable frequency oscillator under control of said sweep generator, means connected with the output of said variable frequency oscillator and said nonlinear circuit means for producing a first pulse train having a pulse repetition rate proportional to the present slope of said characteristic, frequency divider means connected with said fixed frequency oscillator for deriving a second pulse train having a pulse repetition rate proportional to the desired slope of said characteristic, and comparator means responsive to the first pulse train and to said second pulse train means for deriving a control voltage in response to the difference in phase of corresponding pulses of said pulse trains, and means for connecting said control voltage with said sweep generator for regulating the control of said variable frequency oscillator by said sweep generator.

6. Apparatus according to claim 5, wherein said comparator comprises means for transforming the two pulse trains into a single pulse train on one of two output lines in accordance with the difference in leading or lagging phase between the corresponding pulses of the pulse trains, and developing a control voltage proportional to the pulses of the single pulse train on said one output line.

7. Apparatus according to claim 6, including a low pass filter connected to said comparator for deriving said control voltage from said single pulse train.

8. Apparatus according to claim 6, including delay means connected with said frequency divider means for deferring operation of said frequency divider means for a predetermined period following initiation of every cycle of operation of said sweep generator.

9. Apparatus according to claim 7, wherein said delay means comprises a counter, means for supplying pulses to said counter, and means connected to said counter and to said frequency divider means for disabling said frequency divider means until a predetermined number of pulses has been counted by said counter and for stopping said frequency divider means after every cycle of operation of said sweep generator.

10. Apparatus according to claim 9, wherein said means for supplying pulses comprises a second fixed frequency oscillator, and means for initiating operation of said second oscillator simultaneously with the initiation of said sweep generator.

* * * * *